United States Patent Office

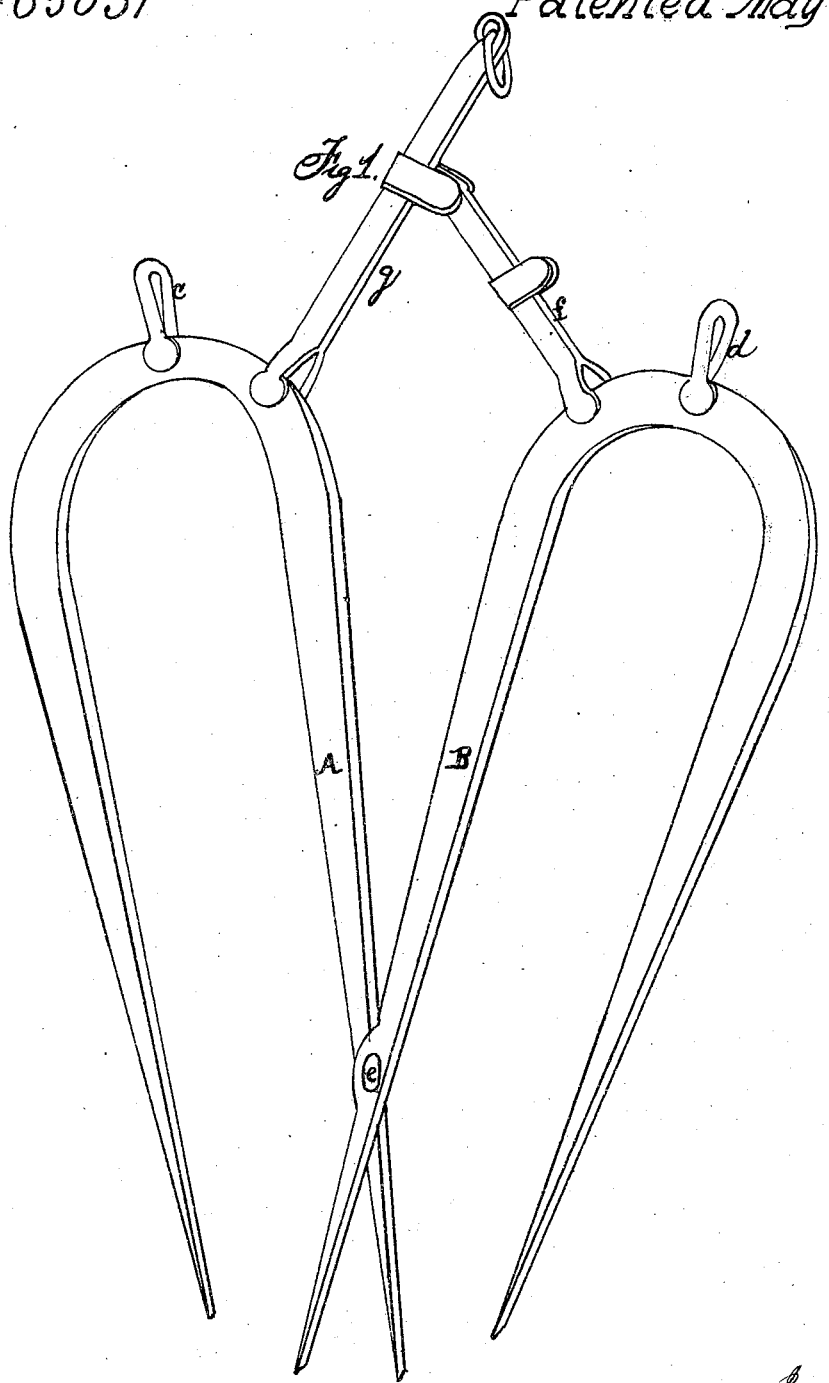

MICHAEL WINSLER, WILLIAM CAMPBELL, AND LYMAN HARDMAN, OF TUSCARAWAS COUNTY, OHIO.

Letters Patent No. 65,031, dated May 21, 1867.

IMPROVEMENT IN HORSE HAY-FORKS.

*The Schedule referred to in these Letters Patent and making part of the same.*

TO ALL WHOM IT MAY CONCERN:

Be it known that we, MICHAEL WINSLER, WILLIAM CAMPBELL, and LYMAN HARDMAN, of Tuscarawas county, and State of Ohio, have invented certain new and useful improvements in Hay-Lifters; and we hereby declare that the following is a true, full, and exact description of the same, reference being had to the accompanying drawings, and to the letters of reference marked thereon. In the drawings annexed, which make a part of this specification—

Figure 1 represents a perspective view of our hay-lifter.

The letters A and B represent the forks, each having two tines, and being made sufficiently long to hold between them as much hay as one person can conveniently lift. The inner tines of the forks A and B are so constructed as to lap each other a short distance from their points, and there work on the pivot $e$. On the upper and curved ends of the forks A and B are pivoted the clevises $c$ and $d$, the offices of which will be hereinafter explained. $f$ represents a bar forked at the lower end, so as to embrace the curved part of B. The upper end of bar $f$ is pivoted to a clip on the vertical bar $g$, which is pivoted to fork A.

To prepare our hay-lifter for use a rope will be fastened either to clevis $c$ or to a ring at the upper end of bar $g$. The other end of said rope will be held by the person in the wagon or in the loft above. A second cord will be fastened to the ring on bar $g$, and then passed through clevis $d$.

When the ropes are adjusted in the manner above described, the lifter will be operated as follows: The person above who holds the end of the rope will raise the lifter to the proper height, and, letting it descend on the hay-cock, it will, by its momentum, penetrate the hay as far as required. He will then relax the rope sufficiently to allow bars $g$ and $f$ to play on their respective pivots. The operator who is placed below to manage the lifter will now pull the cord that passes through the ring on bar $g$ and clevis $d$, and by this operation bring the bars $g$ and $d$ nearly to a horizontal position, and, by throwing the curved ends of forks A and B further apart, will necessarily bring the tines of the two forks so close together at their points as to prevent the hay from escaping. The lifter, being thus filled, will be drawn up and the contents discharged by throwing bar $g$ in a vertical position, and thus separating the tines and withdrawing them from the hay.

Having thus described our invention, what we claim, and desire to secure by Letters Patent, is—

The forks A and B, when constructed and operated in such a manner that the point of the outside tine of each fork will come in contact with the point of the inside tine of the other fork, substantially in the manner and for the purpose herein set forth.

MICHAEL WINSLER,
WILLIAM CAMPBELL,
LYMAN HARDMAN.

Witnesses:
  BALDWIN HIRSITS,
  S. HOOVER.